UNITED STATES PATENT OFFICE 2,525,137

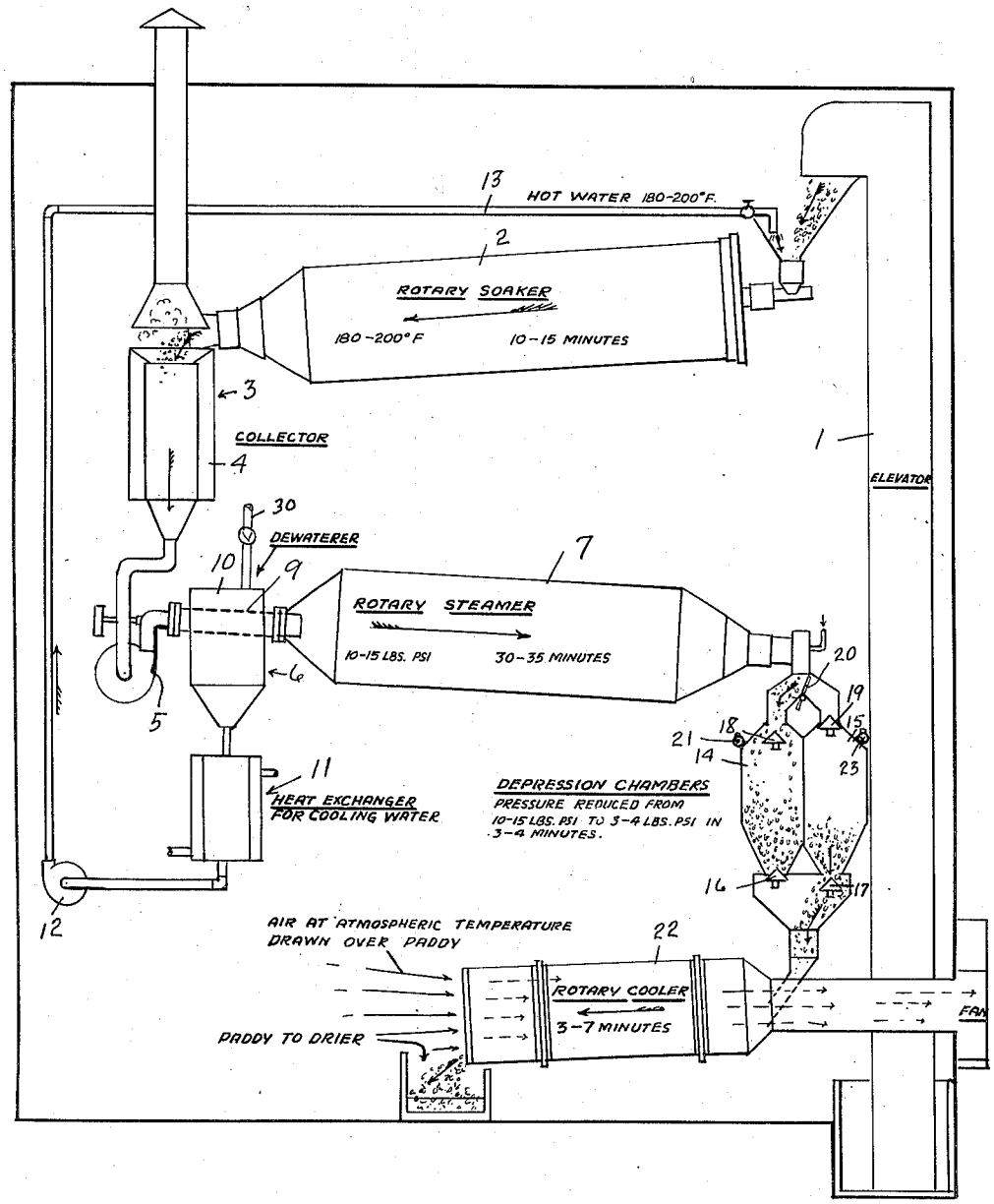

RICE TREATING PROCESS

Watkins W. Jones and George W. Brewer, Sacramento, and Alva B. Court, San Francisco, Calif., assignors to Rice Growers Association of California, Sacramento, Calif., a corporation of California Application September 23, 1946, Serial No. 698,736

8 Claims. (Cl. 99—80)

This invention relates to a rice paddy treating process and has for one of its main objects an improved process for treating the rice paddy prior to milling so that the breakage in the milling process will be reduced.

Another object of the invention is an improved process for treating the rice paddy prior to milling so that the rice will resist breakage in the milling process, and so that the grains will be substantially undistorted and substantially free from white spots.

A still further object is a process for moving the rice paddy along a path of travel and during said movement treating the paddy by soaking, steaming under pressure, and cooling and partially drying the paddy under atmospheric temperature, in succession, each step being controlled as to time and temperature so that the finished product will be ready for being dried and milled in the conventional manner, without substantial distortion and breakage of the grains and which grains will be substantially free from white spots.

Heretofore, as disclosed in copending application Serial No. 588,726 filed April 16, 1945, Patent No. 2,515,409 issued July 18, 1950, the parboiling of paddy preparatory to milling the rice has been done in batches and under times and temperatures that differ from those herein given. While the finished product under the process disclosed in said application was commercially acceptable and the grains were more uniform in shape and color than prior to that time, the present process results in noticeably greater uniformity in color and shape and in freedom from susceptibility to breakage of grains in milling. Also, tests under governmental supervision clearly show that the rice treated by the present process is at least the equivalent if not greater in food values to that produced under the process disclosed in the above copending application.

The drawing is illustrative of the steps of the process as well as being diagrammatic of apparatus adapted to carry out the process.

In detail, after the paddy rice has been cleaned of chaff, seeds, etc., it is conveyed by an elevator 1, to the elevated end of a horizontally elongated, rotary soaking drum 2 and is deposited into said end together with water at a temperature of between about 180° F. and 200° F., preferably closer to the latter. The paddy and water move through this drum together, the drum being heat insulated to maintain the temperature of the water as uniform as possible. From between about 10 and 15 minutes time is required for the paddy to move through drum 2.

At the discharge or lower end of drum 2 the paddy and a substantial amount of water is discharged into a collector tank 3 that may be surrounded by a hot water jacket 4 to keep up the temperature, and from this tank the paddy and water is pumped through a pump 5 and through a dewatering device 6 and then into the upper end of a slightly inclined horizontally elongated steamer drum 7 in which a steam pressure of between about 10 and 15 lbs. per square inch is maintained during rotation of the drum and movement of the paddy from the upper to the lower end of the latter. A pressure of about 12 lbs. per square inch is preferred.

The dewaterer may comprise a generally horizontally disposed rotary screen 9 that extends through the upper end of enclosed tank 10 and through which screen the paddy is moved into the steamer drum 7. The steam pressure in the drum is therefore also in screen 9, but the head of water and paddy at the pump prevents escape of the steam. In the dewatering device the water will drain from the paddy, which draining is facilitated by the replacement of the water in the body of paddy in screen 9 by the steam. The water and steam condensate then passes through a heat exchanger 11 where the temperature of the water is reduced to between about 180° F. and 200° F. (preferably nearer the latter) and is pumped by a pump 12 back through pipe 13 to the head end of the soaking tank for reuse.

About 30 to 35 minutes is required for the paddy to move through the steamer drum 7, and the paddy is constantly agitated by rotation of the drum during this time so all of the paddy will be uniformly exposed to the steam.

The paddy is then substantially constantly discharged from the discharge end of tank 7 into one or the other of a pair or more of decompression chambers 14, 15. Valves 16, 17 close the lower ends of said chamber respectively, while valves 18, 19 close the upper ends of said chambers. In operation the pressure in the steamer 7 and in the decompression chamber into which the paddy is being discharged are the same or about twelve pounds. For example, in the drawing, valve 16 in chamber 14 is shown closed while valve 18 at the top of said chamber is open, and the rice paddy is flowing into chamber 14. Valve 19 at the top of chamber 15 is closed. Therefore the steam pressure in chamber 14 will be the same as in the steamer.

Upon the chamber 14 being filled to a predetermined level, which may be determined by suitable automatic controls, the valves 18, 17 will be closed and valve 19 will open, whereupon the paddy from the steamer will flow into the chamber 15 and as chamber 15 will be in communication with the steamer 7, the pressure in said chamber will be the same in the steamer, or from 10 to 15 lbs. per square inch, but preferably about 12. A selector gate 20 may be provided and suitably controlled for deflecting the flow of paddy from one chamber to the other according to which of the valves 18, 19 are open.

As soon as the valve 18 closes (referring to the operation as illustrated) a valve 21 will open just sufficiently to reduce the steam pressure in chamber 14 to about 3 to 4 lbs. per square inch (preferably about 4 lbs.) over a period of from about 3 to 4 minutes time. This slow reduction in pressure is desirable to prevent rupture of the cells, expansion of rice, and distortion of the latter.

The paddy may remain in chamber 14 under the 3 to 4 lbs. pressure for a relatively short time, but as soon as the pressure has dropped to 3 to 4 lbs., the valve 16 may be opened and the paddy from chamber 14 discharged into the upper end of a horizontally elongated slightly inclined rotary cooler 22.

Insofar as chambers 14, 15 are concerned, they will alternately fill and empty in the above described manner, a valve 23 being also provided for chamber 15 for functioning in the same manner as valve 21. It is manifest that the flow from steamer 7 into one or the other of the decompression chambers is constant, and a continuous flow from some one of the decompression chambers may be effected by regulation of the capacity and number of said chambers and the rate of flow therefrom. However, there will be an interruption of the flow amounting to from 3 to 4 minutes in order to gradually reduce the pressure on the paddy. This does not reduce the volume of paddy passing continuously through the soaker, steamer and cooler, however, inasmuch as the decompression chambers will fill and empty with sufficient rapidity to take care of the maximum capacity of the soaker and steamer.

The rotary cooler 22 may be provided with the conventional flights to continuously lift the paddy and drop the same during the travel of the paddy through the cooler to its lower end, and during said travel, a current of atmospheric air is drawn through the cooler counter to the general directional movement of the paddy by means of a suction fan 25. The paddy will remain in the cooler about 3 to 7 minutes, inasmuch as this is sufficient time to prepare the paddy for being dried in the conventional rice driers which do not form part of this invention. Ordinarily about five minutes will reduce the temperature of the paddy and also remove the surface moisture. The paddy itself will contain from about 30 to 35% moisture when discharged from the cooler. Unless this surface moisture is removed, the paddy would be too sticky to handle satisfactorily in the subsequent drying step.

The product resulting from the above process (including the final usual drying step) mills with the minimum of breakage, thereby producing a large yield of bead rice. Also, rice grains are substantially free from distortion, and the objectionable white spots or "white bellies," and the food values are far greater than in ordinary milled rice. In appearance, the grains are more of a translucent character than opaque, and have none of the chalky characteristics of most rice. The grains are very hard, and do not cook up any faster than the ordinary rice, and while the dried product has a slightly tan or yellowish cast, it will be restored to the usual whiteness upon being cooked.

Before concluding, it may be pertinent to note that there is practically no variation in the steam pressure in the steamer when one or the other of the decompression chambers is placed in communication therewith.

It is to be understood that the detailed description and drawings are not to be considered restrictive of the invention, but merely illustrative of a preferred form thereof.

In some installations it has been found quite advantageous to introduce air into the dewaterer at the same pressure as the steam in the steamer through line 30 so that the air will replace the surface water that fills the voids or interstices between the paddy before the paddy goes into the steamer. This reduces the amount of condensation of steam in the dewaterer without loosing steam pressure. This replacement of the water in the paddy at this point is very important.

From the foregoing it will be seen that the rice paddy moves continuously along an enclosed path of travel in which path it is successively soaked, freed from surplus water in the interstices between the individual paddy units; steamed under pressure, removed from such pressure and freed from surface moisture as well as partially cooled. The rice paddy can be comfortably handled by hand after it passes through the rotary cooler, the latter, however, being chiefly concerned with removing the surface moisture. By causing the paddy to fall through the current of air in the cooler while it travels in its enclosed path out of the cooler, has been found to be the most satisfactory method of performing this step.

We claim:

1. A process of treating rice paddy for milling that comprises the steps of soaking the paddy in water having a temperature between about 180° F. and 200° F. for a period between about ten and fifteen minutes, then removing the paddy from the water and subjecting it to steam under a pressure between about 10 and 15 lbs. per square inch for a period of time between about 30 and 35 minutes, then progressively reducing the pressure to atmospheric pressure, then removing surface moisture from said paddy and reducing its temperature.

2. A process of treating rice paddy for milling that comprises the steps of soaking the paddy in water having a temperature between about 180° F. and 200° F. for a period between about ten and fifteen minutes, then removing the paddy from the water and subjecting it to steam under a pressure between about 10 and 15 lbs. per square inch for a period of time between about 30 and 35 minutes, and constantly agitating said paddy during said steaming, then progressively reducing the pressure to atmospheric pressure, then removing surface moisture from said paddy and reducing its temperature.

3. A process of treating rice paddy for milling that comprises the steps of soaking the paddy in water having a temperature between about 180° F. and 200° F. for a period between about ten and fifteen minutes, then removing the paddy from the water and subjecting it to steam under a pressure between about 10 and 15 lbs. per square inch for a period of time between about 30 and 35 minutes, then progressively reducing the pressure to atmospheric pressure, then removing surface moisture from said paddy and reducing its temperature, by subjecting said rice to a current of air at atmospheric temperature for a period of between about 3 and 7 minutes.

4. A process of treating rice paddy for milling that comprises the steps of soaking the paddy in water having a temperature between about 180° F. and 200° F. for a period between about ten and fifteen minutes, and constantly agitating said paddy during said soaking, then removing the paddy from the water and subjecting it to steam under a pressure between about 10 and 15 lbs. per square inch for a period of time between about 30 and 35 minutes, then progressively reducing the pressure to atmospheric pressure then removing surface moisture from said paddy and reducing its temperature.

5. A process of treating rice paddy for milling that comprises the steps of soaking the paddy in water having a temperature between about 180° F. and 200° F. for a period between about ten and fifteen minutes, then removing the paddy from the water and subjecting it to steam under a pressure between about 10 and 15 lbs. per square inch for a period of time between about 30 and 35 minutes, and constantly agitating said paddy during said steaming, then progressively reducing the pressure to atmospheric pressure, then removing surface moisture from said paddy and reducing its temperature, by subjecting said rice to a current of air at atmospheric temperature for a period of between about 3 and 7 minutes.

6. A process of treating rice paddy for milling that comprises the steps of soaking the paddy in water having a temperature of between about 180° F. and 200° F. for about twelve minutes, then removing the paddy from the water by draining the water therefrom and thereafter subjecting said paddy to steam under a pressure between about 10 and 15 lbs. per square inch for a period of time between about 30 and 35 minutes and causing a constant tumbling and agitation of the paddy during said steaming, then progressively reducing said presure to between about 3 and 4 lbs. per square inch over a period of about 4 minutes, finally reducing said pressure to atmospheric pressure and then partially drying and cooling said paddy.

7. A process of treating rice paddy for milling that comprises substantially continuously moving said paddy along a substantially enclosed path of travel and during said movement and in succession, soaking the paddy in water of a temperature of between about 180° F. and 200° F. for a period of about 12 minutes, removing free water from said paddy, subjecting said paddy to steam pressure of between about 10 and 15 lbs. per square inch for between about 30 and 35 minutes, slowly reducing said pressure to about 4 lbs. per square inch and thereafter to atmospheric pressure, removing surface moisture from said paddy and reducing its temperature a predetermined degree.

8. In the process of treating rice paddy for milling the steps of; moving said paddy along an enclosed path of travel, successively soaking said paddy in water of a temperature of from about 180° F. to about 200° F. for about fifteen minutes, replacing surplus surface soak-water with an elastic fluid, steaming said paddy under about ten to fifteen pounds pressure for about thirty to thirty-five minutes, removing the rice from said steam and pressure, and removing surface water from the paddy by causing said paddy to fall through a current of air during the movement of the paddy in said path, said paddy being in continuous movement during the aforesaid steps.

WATKINS W. JONES.
GEORGE W. BREWER.
ALVA B. COURT.

REFERENCES CITED

The following references are of record in the file of this patent:

UNITED STATES PATENTS

| Number | Name | Date |
|---|---|---|
| 2,185,053 | Dils | Dec. 26, 1939 |
| 2,287,737 | Huzenlaub | June 23, 1942 |
| 2,334,666 | Yonan-Malek | Nov. 16, 1943 |
| 2,358,250 | Rogers | Sept. 12, 1944 |
| 2,438,939 | Ozai-Durrani | Apr. 6, 1948 |